United States Patent Office 3,416,910
Patented Dec. 17, 1968

3,416,910
METHOD OF PREVENTING REVERSION TO CITRATE INSOLUBLE FORM
Casimer C. Legal, Jr., and Alvin Richmond, Baltimore, Md., and Anthony J. Bruno, Jr., New Canaan, Conn., assignors to W. R. Grace & Co., New York, N.Y., a corporation of Connecticut
No Drawing. Continuation-in-part of applications Ser. No. 330,242, Dec. 13, 1963, and Ser. No. 412,243, Nov. 18, 1964. This application Oct. 28, 1965, Ser. No. 505,447
2 Claims. (Cl. 71—39)

ABSTRACT OF THE DISCLOSURE

A method for preparing a slurry fertilizer comprising acidulating phosphate rock with an acid selected from the group consisting of nitric, phosphoric and sulfuric acids and mixtures thereof. A reversion inhibitor is added to the acidulate to block reversion of the phosphorus to its citrate-insoluble form. The reversion inhibitor or Ca reactant is added in an amount less than the stoichiometric amount required to react with the calcium present in the phosphate rock and in an amount not greater than that which would cause the slurry to lose its slurry characteristics. Ammonia is next added to the acidulate to neutralize the mixture and the resulting product is sprayed into the soil as a slurry.

---

This application is a continuation-in-part of our copending applications Ser. No. 330,242, filed Dec. 13, 1963, now abandoned and Ser. No. 412,243, filed Nov. 18, 1964, now abandoned.

This invention is directed to fertilizers made by acidulating phosphate rock and is particularly applicable to a process for making and using slurry fertilizers including nitrogen and phosphorus and which may contain other agriculturally beneficial materials and to the novel products so made.

Throughout the specification and claims, the term "slurry fertilizer" designates a fertilizer that is a liquid suspension in which the solid phase is preponderant over the liquid phase. Generally, the slurry contains nutrient salts in finely divided solid form in solution, as well as, various inert substances, present by reason of being by-products or by reason of deliberate addition. Other active ingredients may also be present.

An object of this invention is to utilize phosphate rock as a fertilizer with a minimum of treatment and handling being necessary.

Another object of this invention is to provide a particularly inexpensive method of using phosphate rock as a fertilizer.

Still another object is to combine phosphate rock with other materials having potential agricultural value in a manner that will enhance their agricultural value.

A further object of this invention is to combine phosphate rock with other materials in a manner that will produce a slurry that may be easily and economically handled and applied for agricultural purposes.

A still further object is to combine phosphate rock with other materials in such a way and in such combinations that a slurry will be produced that is resistant to settling, relatively stable in available nutrient values, relatively neutral in pH, having good relative viscosity that permits pumping and spraying, and having desirable storage characteristics.

Another object of this invention is to provide an easy to operate procedure for producing such a slurry.

A still further object of this invention is to provide a new and improved fertilizer having a desirable slurry characteristic.

Summarily, in carrying out one aspect of the present invention, in one form thereof, ground phosphate rock is added at a controlled rate to nitric acid in the presence of an anionic surface active defoamer-dispersant, the phosphate rock is acidulated converting the phosphorus to a plant available form and a reversion inhibitor is added to the acidulate. Following this, ammonia is added to the acidulate at a controlled rate to substantially neutralize the reaction mixture. After this KCl and other agriculturally beneficial materials may be added. All of the process is carried out while the reaction mixture is maintained fluid and a new and improved fertilizer is provided in slurry form.

The following abbreviations are used in this application. 1–1–1 ratio which may be a 9–9–9 grade and 1–2–1 ratio which may be a 7–14–7 and similar series. These series represent the N-P-K relationship of a fertilizer expressed as the ratio in weight equivalents of $N$-$P_2O_5$-$K_2O$ values of nitrogen-phosphorus-potash. While phosphorus is expressed as $P_2O_5$ and potash as $K_2O$ the elements may actually be present in other chemical forms. TPA=total phosphoric acid (as $P_2O_5$); CI=citrate insoluble phosphorus (as $P_2O_5$); and APA=available phosphoric acid (as $P_2O_5$). Ammoniation is used in its broadest sense and includes the introduction of ammonium ions as salts or in any other form.

In general, monocalcium phosphate is water and citrate soluble, dicalcium phosphate is citrate soluble but water insoluble and tricalcium phosphate is both water and citrate insoluble. Generally plant nutrients that are either water or citrate soluble are considered available plant nutrients and those that are both water and citrate insoluble are considered unavailable and lacking in fertilizer value. Reversion refers to the changing of phosphorus from an available to an unavailable form.

By the process of acidulation, unavailable phosphorus in naturally occurring phosphate rock can be converted to an available form. Neutralization can have the effect of causing available phosphorus to revert to an unavailable form. Water soluble nutrients tend to leach out of soils when water flows through the soil, while citrate soluble nutrients are resistant to leaching. Thus, the conversion of water soluble phosphate to citrate soluble phosphorus is a useful change because it reduces the loss of the phosphorus due to leaching.

In the course of research leading to the development of this invention it was found that in acidulating phosphate rock with nitric acid and acid mixtures a good conversion of phosphorus to a plant available citrate soluble form was achieved. Upon ammoniation of the resulting slurry to a neutral pH it was found that the phosphorus had substantially reverted (typically up to 50%) to a citrate insoluble and therefore unavailable form. When rock phosphate is acidulated it is believed that the phosphorus is converted directly from a tricalcium form to a monocalcium form. The conversion of this monocalcium phosphate to dicalcium phosphate would be useful because it would reduce loss of the nutrient due to leaching. Therefore, the conversion of monocalcium phosphate to dicalcium phosphate is desirable if its further reversion to tricalcium phosphate can be prevented. It is believed that monocalcium phosphate converts to dicalcium-phosphate before reverting to tricalcium phosphate rather than going directly from monocalcium phosphate to tricalcium phosphate.

It was discovered during the research leading to this invention that reversion could be prevented by adding phosphoric acid or a sulfate to the reaction mixture before ammoniation was begun. The sulfate was added in a soluble form as potassium, ammonuim, magnesium, or sodium sulfate or as sulfuric acid. It was further discovered that the amount of phosphoric acid and sulfate needed to prevent reversion in the slurry system was less than the stoichiometric amount necessary to react with the quantity of calcium present to prevent the reversion of an excessive amount of the phosphorus to an unavailable form. Thus, the addition of the phosphoric acid and the sulfate unexpectedly functioned in some way to block or prevent the reaction of the available calcium with the phosphorus.

It has, therefore, been demonstrated that with the slurry fertilizer system of this invention the ratio of calcium to phosphorus that is critical to maintaining a high degree of phosphorus availability during ammoniation is higher than the stoichiometric quantities that could bring about a reversion to tricalcium phosphate. Practicing the teaching of this invention it has been possible to produce phosphorus containing fertilizers from raw phosphate rock that could be applied directly to the soil as an unrefined slurry. These slurries have end product contents of available or citrate soluble phosphorus value of at least about 85% based on the phosphorus value in the starting phosphate rock. The end product conversion rate is normally 90% (on a rock basis), typical conversions are in the range of 95%, and end product conversions of 97% are not uncommon.

In making the calcium to phosphorus adjustment in a 1-1-1 fertilizer, such as the one in Example 3, with potassium sulfate ($K_2SO_4$) it was found that an amount of $K_2SO_4$ equal to about 4% of the final batch weight was required to yield a fertilizer having about 92% of its phosphorus in plant available form and about 8% of its phosphorus in unavailable form. Theoretically this would provide enough sulfate to tie up only 6.66% of the calcium present in the phosphate rock in the fertilizer. When no sulfate was added to such fertilizer formulations the phosphate content reverted to about 50% unavailable phosphate upon ammoniation. The addition of larger amounts of $K_2SO_4$ in a 1-1-1 fertilizer does not appear to significantly reduce reversion below about the 8% level. In commercial operations, where mixing may not be quite as complete as in the lab, slightly larger quantities of sulfate may be needed to obtain equal effectiveness.

When the amount of sulfate added to a slurry formulation, such as the formulations given in the examples at the end of this specification, exceeds about 4% of the final batch weight the slurry will lose its slurry characteristics and set up as a solid. Therefore, in a 1-1-1 fertilizer such as the one in Example 3 the amount of potassium sulfate added should be more than 3% on a weight basis but less than 4% based on the $SO_4$ weight basis.

Each formulation forms a different chemical system and the amount of sulfate ($SO_4$) needed to prevent reversion in one formulation may not suffice in another. The same is true about the amount of sulfate that will cause the batch to set up. The amount differs somewhat in each formulation. However, using the teachings of this invention the amounts can be easily determined by starting with a small amount of sulfate, in small sample batches, for example about 0.5%, and increasing the amount slowly until the proper amount is found. Each batch can be analyzed as the amounts of ($SO_4$) are increased until the optimal quantity of $SO_4$ addition is found.

In practicing the invention, phosphate rock is treated with nitric acid to convert the unavailable phosphate of the phosphate rock to an available form. Nitric acid is chosen because it not only converts the phosphate to an available form of phosphorus but adds nitrogen to the resulting slurry mix as well. Nitric acid like phosphate rock is not suitable for use as a fertilizer in its pure form. However, after nitric acid is reacted with phosphate rock and the acidulate is neutralized with ammonia, the nitric acid, the phosphate rock and the ammonia provide an excellent fertilizer mix. Depending upon the particular nitrogen and phosphorus analysis required other acids may be used as acidulating agents, other supplemental sources of phosphorus may be used and other neutralizing agents may be used. For example, $H_2SO_4$ is used as an acidulating agent and $H_3PO_4$ as a supplemental source of phosphorus in Example 5. The phosphoric acid would, of course, also serve as a supplemental acidulating agent even though it does not seem to be as strong an acidulating agent as nitric and sulfuric acid in the slurry systems of this invention. Price considerations play an important part in making these choices within the operable possibilities. For example, the nitrogen supplied as $NH_3$ is generally kept at the maximum and that supplied as $HNO_3$ to a minimum. This is important because nitrogen from $NH_3$ is cheaper than that from $HNO_3$. All of the materials added must be considered both from the standpoint of their value as active agents in the phosphate rock reduction system and its preparation for use as a slurry fertilizer and from the standpoint of their value as contributors of agriculturally beneficial materials.

When carrying out the acidulation phase of the process of this invention, whether using nitric acid alone or using a mixture of nitric acid, and sulfuric acid or phosphoric acid, it is important to have an acid concentration as measured by the mole ratio of hydrogen ions to $P_2O_5$ value of phosphorus from the rock in excess of 6/1. The hydrogen ions in question are, of course, restricted to active hydrogen.

The acid is placed in a reactor equipped with an agitator and the phosphate rock is added as quickly as it can be thoroughly mixed into the acid. For good acidulation the acid and the phosphate rock must be thoroughly mixed into complete contact with one another.

An anionic surface active agent is added to the reactor simultaneously with the phosphate rock in an amount sufficient to control foaming to facilitate the ease of processing. There are a number of well known surface active agents suitable for use as the defoamer dispersant. In general, these are the alkali metal salts of sulfonated long chain molecules, e.g., sulfonated fatty acids, sulfonated hydrocarbons (including the sulfonated alkyl aromatics), and the like. Suitable defoamers of these general types, or their equivalent, are available commercially under trademarks, including OA-5 (Sodium salt of sulfonated oleic acid), Swift 67A, Hodag Nalco 74 and Unitex Defoamer-P.

It has been discovered that the anionic surface active agent is not only important as a defoamer, it is also important as an aid to fluidity. The amount of anionic surface active agent necessary to control foaming has been found to be a sufficient quantity to also function effectively as a dispersant, maintaining good fluidity in the slurry and assisting in rendering the slurry non-thixotropic.

After the phosphate rock addition has been completed and a short period of time has elapsed to obtain substantially complete acidulation of the phosphate rock, neutralization of the batch by the addition of anhydrous ammonia is begun. Acidulation will usually continue for a short time after the ammonia addition has begun.

If $H_2SO_4$ or $K_2SO_4$ are to be added they may be added at any time before ammoniation is begun. The sulfuric acid can be conveniently added to the original acid in the reactor before the addition of the phosphate rock is begun and the potassium sulfate, which is a solid, can be added at the same time the phosphate rock is added.

When considering which time to add the sulfuric acid several factors should be kept in mind. Sulfuric acid has certain intermediate levels of concentration at which it is particularly corrosive and it may be desirable to avoid such concentrations to prolong the life of the reactor. It has been observed that when the sulfuric acid is added after some of the ammonia (up to about 20%) has been added, a thick processing stage through which the batch passes at a pH of about 1–2 is less severe than when the sulfuric acid is added during the acidulation phase of the process. Of course, when the sulfuric acid is added after neutralization with ammonia has begun, some of the acidulation value is lost, but the gain in fluidity during the thick stage is often sufficiently important to make the small loss in acidulation value worthwhile. The batch is sufficiently acid after 20% of the ammonia has been added for the $H_2SO_4$ to have a good acidulating effect.

The addition of sulfate as a reversion preventive has already been discussed. At that time it was pointed out that when the sulfate content exceeded about 4% in a formulation such as those given in the examples the slurry would lose its slurry characteristics and set up as a solid. The previous discussion will not be repeated here but it applies to sulfuric acid just as much as it applies to other sulfates. Thus in practice sulfuric acid is normally used in the slurries as otherwise appropriate at rates of from about ½–4% on an $SO_4$ weight basis of the end product.

Ammonia is introduced into the acidulate until a substantially neutral pH is attained. Although there is some variation from one formulation to another, in general, it has been observed that a pH of about 7.5 provides a slurry having the best physical properties commensurate with a neutrality that is not significantly damaging to mild steel storage tanks and applicator equipment. As the pH is pushed above 6.5 the batch begins to approach saturation and ammonia tends to be less readily absorbed and more readily lost. Additionally, it has been found that slurries that contain phosphoric acid have a tendency to become unpumpable gels in storage when their pH's are finished off at a pH range of 6.5 to 7.5. This may be remedied during manufacture by finishing the batch at a pH of 6.5 or lower or by finishing the batch at a pH of 7.5 or above. A pH of 4 is sometimes satisfactory, a pH of 5 gives good results but a pH of 6.0 to 6.5 is better. The pH of the batch is usually well below 1 when ammoniation is begun.

Thick stages are a factor in processing all of the formulations given in the examples included in this application. As the ammoniation progresses a thick batch stage manifests itself at a pH in the general range of about 1–2. In certain instances batches have set up almost to a solid when the ammoniation rate was too high in relation to other processing conditions at this point. If the ammoniation rate is not reduced at such a time the batch may completely solidify. A second thick stage generally occurs at a pH of about 4–5. This thick stage generally appears to be less severe than the first thick stage. When a batch becomes thicker ammonia blow-by becomes a problem because the ammonia forms pockets and collects in quantities that pass out rather than dispersing.

Careful control of the concentration, temperature and ammoniation rate can largely eliminate thick stage difficulty. Viscosity during processing is to a large extent controlled by the relationship between the concentration of the batch, the ammoniation rate, the temperature and the pH of the batch. In general, it has been found that thick stage difficulty increases as the ammonia addition rate increases. Conversely a decrease in the ammoniation rate decreases thick stage difficulty. An increase in temperature decreases thick stage difficulty and thus ammoniation can proceed at a high rate when the temperature is increased without undue thick stage difficulty. A reduction in the water content increases concentration of the batch and reduces thick stage difficulties in 1–2–x formulations but if too much water is removed the material will, of course, loose fluidity because it would be dry. In 1–1–x formulations an increase in the water content adds fluidity and reduces thick stage difficulties. However, the addition of water should be held to the minimum amount required to keep the system fluid until after acidulation has been substantially completed because the water will dilute the acid and make it a less effective acidulant.

Generally, the water content of the slurry fertilizers is kept to a minimum because the more concentrated the slurry is the more nutrient elements per unit volume that must be handled. The value of a fertilizer is directly proportional to the quantity of nutrients it contains and therefore the more concentrated the slurry the more valuable per unit volume that must be handled. Only enough water is added to supply the necessary fluidity.

Water is usually added at several different periods during the processing of a batch. In the 1–1–x formulations given in the examples just enough water is added initially with the acid to keep the system fluid. The water added initially is held to a minimum because it dilutes the acid lessening its effectiveness as an acidulant. The balance of the formulation water is normally added after acidulation, immediately before ammoniation is begun. The amount of water needed to replace the water that will be lost by evaporation or boil off is often calculated and added at this time also. A small amount of water is usually held back so that small variations in processing can be compensated for by varying the amount of water added at the end of each batch process.

However, in the 1–2–x ratio formulations given in the examples the risk of a thick stage occurring during ammoniation decreases as the amount of water added before the start of ammoniation decreases. This is surprising because it would appear that water would add fluidity, but within the maximum amount of water permissible to meet analysis this has not been found to be true. Thus most of the water is added at the end of processing in 1–2–x formulations. However, in such 1–2–x formulations enough water must be present during ammoniation to prevent the acidulated batch from being so supersaturated that it will not absorb $NH_3$ readily.

The original recipes developed in the course of research leading to this invention indicated, in many instances the desirability of supplementary cooling during processing. It originally appear that ammoniation was most effective when using supplementary cooling to hold the temperature of the batch to about 190°–200° F. during ammoniation. In the lab it was observed in several instances that a considerable amount of the phosphorus reverted to citrate insoluble forms during ammoniation when the temperature was not maintained below about 200° F. Further, ammonia was lost when added to the batch at high temperature because of the ammonia vapor pressure and the churning of the batch as a result of boiling. As the pH rose the batch became more saturated and, of course, the rate at which ammonia could be absorbed decreased.

While some ammonia is lost even under supplementary cooled process conditions, this loss becomes a much greater problem at the higher temperatures and the resulting higher vapor pressures. Additionally, the slurry produced tends toward a thin fluid consistency when high processing temperatures are used. This has been observed to increase the problem of precipitation during subsequent storage and handling. The precipitate that forms in slurries processed at temperatures above the boiling point tends to be much harder and more difficult to redisperse than the precipitate that forms in slurries processed with cooling holding the processing temperatures below the boiling point. Further noxious fumes are evolved in much greater quantities by slurries that are hot processed than by slurries that are cooled. In addition, it has been discovered that when ammoniation is carried out at high rates and at high temperatures the pH stability is not very good and there is an increased tendency for the pH to regress. Low ammoniation rates and the maintenance of a batch temperature below 200° F. during ammoniation have been found to give more stable pH's although the cool processed slurries also regress but to a lesser degree.

There are two major problems encountered in using the supplementary cooled process. First the time required for the completion of each batch is increased and secondly so much heat is produced by the reaction of ammoniation that a large cooling capacity is necessary to maintain a batch temperature below 200° F. in large commercial batch operations. In many plant locations sufficient water is not available for straight through water cooling of the reactors during ammoniations.

It has been discovered that a good quality slurry can be satisfactorily processed with only ambient cooling when the process is carefully carried out according to the teachings of a preferred embodiment of this invention. The problems mentioned in the preceding three paragraphs are encountered and they do present difficulties but experience has shown that good slurries can be produced using only ambient cooling when following the processes herein described. It is particularly important to obtain accurate ratios of the ingredients and to supply these ingedients at the correct rates and in the correct order when no supplementay cooling means are employed.

If a fertilizer containing potash is desired, KCl (muriate of potash) may be added after ammoniation has neutralized the batch. It is usually preferable to add the KCl shortly before ammoniation is completed because the KCl will partially cool the batch when supplemental cooling is not used. The cooling of the batch permits ammoniation to be continued at a higher rate when it is desired to shorten the batch process time. It is important that the batch be sufficiently neutralized before the KCl is added to substantially eliminate its reaction with free H ions which would produce HCl. Nitric acid is one of the acidulating agents and nitric acid and hydrochloric acid form highly corrosive aqua regia. When $K_2SO_4$ is added earlier in the process to inhibit reversion the potash provided by the $K_2SO_4$ can be counted in calculating the amount of total K that must be added to reach the desired analysis.

The various slurry fertilizer formulations yield slurries that have characteristics in common and yet differ so much that when, for example, a 7-14-7 slurry fertilizer was mixed with a 9-9-9 slurry fertilizer the mixture set up so hard that it had to be dug out of a storage tank.

A fertilizer containing nitrogen, phosphorus and potash is known as a complete fertilizer. However, plants require other nutrients in lesser amounts. Among these other nutrients is a group of nutrient elements known as trace elements. This group includes zinc, iron, boron, copper, manganese and molybdenum. These trace elements, singly or in combination, can contribute to dramatic crop responses when applied in suitable amounts to soils in which they are naturally deficient or unavailable. It has been found that trace elements can be included in the slurry fertilizers of this invention if they are combined in the proper forms and at the proper time during processing.

Trace elements are generally applied for agricultural puposes as salts, sulfates, oxides and chelates. Generally the trace elements should be added to the slurry toward the end of the slurry's sythesis, particularly if the trace element is in chelated form. In this way, exposure of the chelates to low pH and oxidizing conditions is avoided.

There are a number of advantages in "combination slurries" that include trace elements. One of the advantages is the savings obtained by making one application rather than two or more applications when agriculturally treating soil. In addition when a material needed in small quantities can be homogeneously combined with a material needed in greater quantities it is possible to obtain a much more even application of the material needed in a small quantity. Furthermore, when a trace element is combined with major nutrients in a slurry the effectiveness of a given quantity of trace element is believed to be increased because the trace element is always in the same soil situs i.e., the same cubic inch of soil, as the N-P-K components. The trace elements and the N-P-K nutrients appear to have a synergistic type of relationship that is enhanced when they are present in the same unit volume of soil so that they are initially physically present together.

In addition, the trace element is generally (or can readily be caused to be) present in the slurry in both readily soluble and difficulty soluble forms, for example, both as the simple soluble metal salt and as the less soluble metal ammonium phosphate or metal chelate. This is especially important in certain applications, e.g., the application of zinc to corn wherein both immediate and long terms availability is required. Because some of the readily ionized trace element will be tied up as a metal ammonium phosphate which has a low solubility the trace element slurries made in accordance with this invention have some buffering action against toxicity when the trace element is added at an excess rate by mistake. Trace elements can be very toxic if applied in excessive amounts.

Generally the amount of trace element needed in a particular slurry fertilizer formulation is substantially below 5%, usually between 0.5 and 2.5%, and this amount of trace element can often be substituted in a standard slurry fertilizer formulation in place of some of the water without unduly effecting the fluidity of the slurry. An example of this is found in Example 6. If the quantity of trace element needed in a particular situation would significantly impair the required characteristics of a standard slurry formulation then the formulation must be varied in accordance with the teachings of this invention to maintain the required slurry characteristics and the N-P-K analysis must be computed on the basis of the actual analysis that can be obtained.

If it is desired to apply a trace element, for example, zinc chelate, at 2.5 pounds per acre by adding the chelate to a 30,000 pound slurry formulation intended to be applied at the rate of 400 pounds per acre the amount that must be added is readily calculated. The calculation would be $$\frac{30,000}{400} \times 2.5 = 187.5 \text{ pounds}$$

See Example 6 for such formulation. 187.5 pounds would only be 0.625% of the total batch weight.

As previously mentioned when a trace element slurry fertilizer is prepared some of the trace element may be converted to another form. For example, when copper is added as the chelate of EDTA (ethylene diamine tetra acetic acid) ion exchanger may occur with $Ca^{++}$, releasing some $Cu^{++}$ from the chelate, which $Cu^{++}$ would then react with $NH_4^+$ and $PO_4^{\equiv}$ in the known way to form the difficulty soluble copper ammonium phosphate.

With the considerations described in this specification taken into account slurries containing mixtures of trace elements can be readily prepared, e.g., containing 0.625% zinc chelate with 0.35% iron chelate; 0.65% zinc chelate; 0.65% iron chelate; 1% borax, etc. The permutations possible are practically infinite, but can readily be worked out by those skilled in the art following the teachings of this invention.

Agronomic considerations are, of course, paramount in the selection of a given trace element-slurry fertilizer. In the general case, the trace element is used to counteract a specific soil deficiency, and the amount of trace element in the slurry should be adjusted to provide at least a sufficiency, but not such as excess as might result in toxicity to the plant. It is a well known rule in using trace elements, that in case of doubt, too little should be used rather than too much. This is why the apparent "buffering" action which inhibits toxicity that is exhibited by slurry fertilizer is important. When some of the free metal ions are tied up as metal ammonium phosphates they have a low solubility. The availability of the trace element is spread out and its immediate potential to reach toxic levels of availability is reduced. In addition that portion of the trace element that is in a form having low solubility would not leach out of the soil as readily. If it is desired that most or all of the trace element be made slowly available to the plant over the duration of the growing season, the trace element may even be added to the slurry in the form of the respective metal ammonium phosphate, preferably in finely divided form (e.g., about 100–200 mesh) to permit ready passage through the usual spray nozzles when the slurry is sprayed on the field.

Other agronomic considerations must also be taken into account. For example, it is sometimes recommended that manganese and iron not be used together. In fact, iron is commonly added to soils as an "antidote" for tetravalent manganese already in the soil. As a corollary, iron is not generally added to soils deficient in manganese. There are, of course, exceptions to these generalities. Manganese, when used, should be in the divalent form, since tetravalent manganese is not only unavailable to plants but may even oxidize ferrous iron to ferric iron, which is then unavailable to plants. Copper is reported to increase the availability of iron and possibly manganese, and slurries containing all three of these elements may give outstanding results, depending on soil requirements. Often, plants that do not respond well to zinc will make excellent responses if copper is added along with the zinc. But in all cases the trace element-slurry composition, for best economic results, should be prepared in accordance with specific element deficiencies in the soil. It is a paradox in the use of trace elements that their indiscriminate use may actually cause a deficiency. For example, it has been reported that an excess of a combination of cobalt, copper, chromium (as chromate), zinc, manganese, and lead resulted in iron deficiency in the crop treated.

Many commercial N-P-K fertilizers are known to contain small amounts of trace elements, derived in most instances from phosphate rock. With the occasional possible exception of molybdenum, these trace elements are generally not inherently present in amounts agronomically recommended as sufficient to correct specific soil deficiencies in slurry formulations such as those given in the example portion of this specification except when specifically included in the formulation. For example, Florida pebble phosphate rock rarely contains in excess of MnO, 0.05 weight percent, CuO, 0.003, ZnO 0.0005; $MoO_3$, 0.002; and $B_2O_3$, 0.01. Tennessee phosphates may be slightly higher in some trace elements, e.g., MnO may occasionally run as high as 0.3% and ZnO to 0.001%. Thus, in specific cases, a 10,000 lb. 9–9–9 slurry (Example 1) made from a phosphate rock containing 0.5% MnO, would provide 0.06 lb. MnO per acre, as compared to 2.5 lbs. or more $MnSO_4$ per acre recommended as a typical dosage for manganese deficient soil. On the other hand, even these small amounts of trace elements may be quite beneficial in normal soils (soils already containing the respective elements), since they represent ready sources of the elements and assist in replenishing the soil with respect to elements removed by continuous cropping. In addition to the small quantities of trace elements added to the slurry directly in the phosphate rock, small quantities of trace elements may also be added to the slurry in the phosphoric acid. Crude phosphoric acid, for example green acid, is made from rock phosphate and contains a considerable portion of any of the trace elements that were present in the phosphate rock.

The slurries produced by this invention may also contain other agriculturally beneficial ingredients such as additional plant nutrients, insecticides and herbicides. Indeed, those slurries containing $SO_4$ to prevent reversion have a significant amount of the plant nutrient element, sulfur, in them.

Each agriculturally beneficial ingredient that is to be added must either be stable in the particular slurry environment to which it will be subjected or of a character that will be changed by the slurry to a beneficial form. Of course, it is also necessary that the added agriculturally beneficial ingredient not deleteriously affect the other agriculturally beneficial ingredients of the slurry or the slurries processing or handling qualities beyond permissible bounds. In many instances ingredients which cannot be permitted to remain in the fluid slurry for a very long time can be added to a slurry applicator in the field and mixed in just prior to application of the slurry. The slurry generally dries fairly rapidly after application and in its dispersed form generally offers less of a stability problem with respect to such ingredients. Using the slurry as a carrier for such agriculturally beneficial ingredients cuts down the number of independent agricultural applications that need to be made and increases the evenness of application when some of the materials must be applied in small quantities.

An insecticide, aldrin, has been mixed with various slurries prepared as shown in the examples included in this specification after the processing of the slurry was otherwise complete. After one week's storage at room temperature (75–80° F.) the aldrin was found to be 100% stable and the slurry unaffected. Herbicides such as Atrazine (2-chloro-4-ethyl-amino-6-isopropylamino-s-triazine) and amiben (3-amino-2,5-dichlorobenzenoic acid) can also be applied with slurries under proper conditions. It is, of course, very advantageous to couple herbicides and fertilizer slurries, because in general, the fertilizer will stimulate noxious plant growth and the herbicide will be more effective in its selective eradication of this growth if combined with the fertilizer under proper conditions. Many of the herbicides operate through excess stimulation of the plant's growth and the direct combining of the herbicide and the slurry fertilizer may actually improve the herbicides effectivenes in a given amount.

Generally the slurry fertilizers provided by this invention dry as hard light colored, visible splatters. Of course, various additives can effect the color of the slurry without effecting its other physical properties or its agricultural value. They generally have a density of about 1.3–1.6, a sufficient amount of anionic surface active agent in them to render them readily pumpable, non-thixotropic and sprayable at the proper application time. At least 85% and usually 90–95% of their phosphorus is citrate soluble form, and their water content is about 24–38%. Water contents of 15 to 50% may be satisfactory in particular circumstances. The slurries are usually sufficiently neutral to be relatively non-corrosive to mild steel. Usually the pH is from 5–6.5.

While many of the claims give the parts as specific numbers it is to be understood that there is necessarily some range, although, large departures in proportions have generally been found to involve extreme processing difficulty. A clear indication of areas within the permissible ranges is provided in the several examples by the preferred laboratory formulations which are slightly divergent in numerical values from the commercial formulations.

The slurries of this invention have many additional advantages. Because they are liquid they can be sprayed on the soil in a manner that will give a substantially uniform coverage of small spatters of fertilizer. Even when the wind is blowing at 20 miles per hour good uniform coverage can be obtained. When the spatters hit the ground they stick to the ground and do not drift as dry fertilizers do. Many different types of materials can be included in the slurries. Solids can be suspended in them and liquids can be mixed into them. It would, of course, be difficult to mix a small quantity of liquid evenly into a large amount of dry fertilizer and many solids would not suspend well in thin fertilizer solutions. Another desirable slurry feature is the characteristic of the slurries to appear as spatters that contrast in color with the soil in most instances. They, therefore, provide a clear visual indication of those areas that have been sprayed and thus reduce the danger of under, over or spotty and uneven fertilization.

The following examples describe without limiting the invention.

All of the following examples can be carried out using apparatus such as that disclosed in the copending application Ser. No. 330,380 of Anthony J. Bruno, Jr., which was filed Dec. 13, 1963, and which is assigned to the same assignee as this application. An appropriate reactor is typically, and by way of example, a 4000-gallon stainless steel vessel, 9 feet high by 6 feet in radius covered at the top, and equipped with an agitator, a cooling jacket, solid and acid inlets opening through the covered top, a vent duct with a blower for exhausting gases and vapors, and an inlet for anhydrous ammonia extending through the covered top and down the side of the vessel and terminating in a sparger ring discharging under the impeller of the agitator. The reactor vessel can be mounted on a scale for convenience in weighing ingredients as they are added to the vessel.

The commercial formulations of the following examples were conducted in a reactor vessel mounted on a scale as above described. When the phosphate rock was added to the acid mixtures of various materials were lost including dust and carbon dioxide which evolved from the reaction. During the period when the loss was occurring about 40 to 50 pounds depending on formulation, of the Na salt of sulfonated oleic acid defoamer was added to the reactor vessel as required to control foam. It has been found that the net scale weight loss during this period is approximately 4%. Therefore, in each example, the scale weight is less than the actual weight of phosphate rock and defoamer added. The assumed actual weights are given in parenthesis ( ) and the combined scale weight of the phosphate rock and defoamer is given without parenthesis.

During processing a considerable quantity of water is lost by evaporation and this water must be added at the end of the process as needed to bring the final batch up to weight. It will be observed as the examples proceed that this water loss is taken care of by the addition of water at different stages of the process in different examples as may be best suited for each situation. Any water not specifically indicated to be added at a given point in an example is added at the end of the example procedure.

Generally, it is not necessary to wash the reactor down when a batch is removed from the reactor at its completion during large scale commercial operation. However, there are time when it may be necessary because of the lodging of materials in the reactor. This may be done by recirculating some of the slurry to the reactor to initially clean residual solids and foam out of the reactor and then washing the reactor down with a small quantity of water to leave it clean. If KCl is used it may be more important to obtain a good reactor washdown to prevent the formation of HCl when the acid is added to the reactor at the start of the next batch. Other methods of washing the reactor down may be used. For example, the recirculation of the slurry may be omitted and water alone used to wash the reactor down. The wash would contain the residual portion of the product itself and it can be run directly into the slurry just made. If this is to be done, a sufficient quantity of the water should be held back until this time so as not to affect the grade of the fertilizer.

The type of phosphoric acid used is not critical. In the following examples green wet process phosphoric acid is used. However, good furnace acid is suitable. Obviously the amount of water in the acid must be considered in calculating the water needed in the formulations. In general, substantially any commercial grade of phosphoric acid is suitable and the same holds true for nitric acid and sulfuric acid.

The phosphate rock used in the examples was Florida phosphate rock and it had a particle size of substantially 100% through 30 mesh and about 60–70% through 200 mesh U.S. Standard. All of the commercial examples given were conducted at the normal outdoors U.S. weather temperatures with variations from about 0 to 100° F. The laboratory examples were conducted at normal room temperature of from 70 to 80° F.

The grades of materials used in the following examples formulation are listed below. The assumed analysis of the ingredients is given in parentheses. Nitric acid, 55–57% (56.0% $HNO_3$); phosphoric acid, 75% (54.0% $P_2O_5$); phosphate rock, 75 BPL (34.0% $P_2O_5$); Na salt of sulfonated oleic acid, 1:3 dilution in water; ammonia, 82% (82%N); muriate of potash 60–62% (60.0% $K_2O$); sulfate of potash 50–51% (50.0% $K_2O$); sulfric acid, 66% Be (93.0% $H_2SO_4$); zinc chelate of ethylene diamine tetra acetic acid; and aldrin, 40% by weight. In the ratio of ingredients section of each example the water value given includes the water in the nitric acid and phosphoric acid, assuming 22% water in the phosphoric acid. The $P_2O_5$, $K_2O$ and $SO_4$ values given are the $P_2O_5$, $K_2O$ and $SO_4$ equivalents of the P, K, and $SO_4$ contributing ingredients whether or not they are present in the $P_2O_5$, $K_2O$ or $SO_4$ form.

Each of the following examples may give a product analyzing slightly higher than the rated analysis. This is customary in the fertilizer industry, to avoid the risk of penalty under the laws of most states for commercial sales of fertilizers with low analysis. There is some normal variation in the assay allowed within grade of the commercial ingredients used in practicing this invention. From a scientific or technical point of view it is possible to adjust the ratio of reactants to arrive at a predetermined analysis if so desired. The ratio of N-P-K, the pH, the fluidity, and the end product phosphorus conversion are subject to chemical control by a skilled operator when operating according to the teachings described herein.

There are several other factors that also require occasional over formulation. The amount of ammonia required to neutralize to a given pH varies somewhat with different shipments of phosphate rock. This is believed to be due to unknown variations in the kinds and amounts of impurities in the rock. In producing a 1–1–x product using only nitric acid as the acidulent it is found that the minimum amount of nitric acid required for good conversion or acidulation of the phosphate rock is such that, after ammoniation, an overformulation of nitrogen results. In all cases the final product will contain a small amount of $P_2O_5$ value in the unavailable or citrate-insoluble form. It is necessary to predict this amount and to overformulate in $P_2O_5$ in such a way that the total $P_2O_5$ less the citrate-insoluble $P_2O_5$ will yield an available $P_2O_5$ meeting grade.

EXAMPLE 1.—12 TON BATCH OF 9–18–0

| Raw material | Pounds | Pounds N | Pounds TPA |
|---|---|---|---|
| Water | 5,200 | | |
| Nitric acid | 6,650 | 828 | |
| Phosphoric acid | 5,335 | | 2,881 |
| Phosphate rock | (5,200) | | 1,799 |
| Sulfonated oleic acid, Na salt | (50) | | |
| Scale wt. rock and sulfonated oleic acid, Na salt | 5,135 | | |
| Ammonia | 1,680 | 1,378 | |
| Total | 24,000 | 2,206 | 4,680 |
| Formulation analysis | | 9.19 | 19.50 |
| Estimated APA | | | 18.5 |

The ratio of ingredients was thus approximately $HNO_3$ 31, $P_2O_5$ as phosphoric acid 24, $P_2O_5$ as phosphate rock 15, $NH_3$ 14, $H_2O$ at beginning 77, $H_2O$ total 77, and sulfonated oleic acid, Na salt 0.10.

First, the reactor agitator was started and then all of the formulation water plus all of the nitric acid and phosphoric acid was added to the reactor in any desired order, and thoroughly mixed. Next, the phosphate rock was added to the acid mixture at a substantially uniform rate over a period of about 12 minutes. Simultaneously with the addition of the phosphate rock the Na salt of sulfonated oleic acid was sprayed or dripped, onto the up-coming foam as needed to control foam and in an amount of about 50 pounds. After waiting about 10 minutes (measuring from the cessation of rock addition), to allow for the efficient completion of the acidulation of the phosphate rock and the substantially complete conversion of $P_2O_5$, the ammoniation of the acidulate was begun.

In Example 1 the ammonia was initially added at the rate of 3 lb. $NH_3$/min./ton of the final product until 28% of the total ammonia had been added. It has been found that a thick stage will occur when about 30–35% of the total ammonia requirement has been added and a pH of about 2.0 is reached. Prior to the risk of a thick stage occurring the only known limitation on the rate of ammonia addition is the rate at which the ammonia can be absorbed by the acidulate. The initial rate of ammonia addition is therefore based upon the observed rate at which the ammonia can be absorbed.

By the time of the initial 28% of the ammonia addition has been completed the temperature of the batch should have reached at least 190° F. due to the heat provided by the exothermic ammoniation reaction. This has been found to be true even when the ambient temperature at which the batch is started is as low as that normally encountered during the winter in the Mid-West. No supplemental cooling is provided.

After 28% of the ammonia has been added a decreased second ammonia addition rate of 2 lbs. $NH_3$/min./ton of finished product is utilized if the temperature is at least 190° F. by this time. This second rate of ammonia addition is maintained until 50% of the total ammonia has been added. If the temperature is below 190° F. at the beginning of the second ammonia addition the rate should be cut to 1 lb. $NH_3$/min./ton of finished product. Even a lower second ammonia addition rate may be required if the temperature is very low. The risk of thick stage difficulty occurring during the second ammoniation addition may be decreased by providing a high temperature or by reducing the ammonia rate. The thick stage risk is passed when 45–50% of the total ammonia has been added and the pH reaches 3.0.

After the second ammonia addition period a third rate of ammonia addition is begun. At the beginning of this third ammoniation addition phase the rate is increased to 3 lbs. $NH_3$/min./ton of product.

By the time the third ammonia rate is begun the batch will normally be at or near its boiling temperature, and the heat resulting from the reaction of the added ammonia with the acidulate will be dissipated by the evaporation of water from the batch. When boiling becomes vigorous ammonia will be lost due to blow-by (passage of free ammonia vapor through and out of, the mix) if the rate of ammonia addition is too great. As the batch approaches a pH of 7 at boiling temperature the tendency for the ammonia to pass through unabsorbed increases. If the ammonia does begin to pass through the batch unabsorbed this can usually be seen and the rate of ammonia addition can be reduced below the maximum of 3 lbs./$NH_3$/min./ton of product. When the batch approaches a pH of 6 or a total ammonia input of about 90% the rate of ammoniation will normally have been reduced below 30 lbs. per minute. At this time additional water is added to replace the water lost by evaporation. This water is added to a scale reading of 23,920 pounds. The water will reduce the temperature and assist in ammonia retention. This water may be added while ammonia addition is continuing.

Ammoniation is continued to a pH of 6.5 to avoid the possibility of corroding the storage and applicator tanks and also to retard settling during storage. The completion of ammoniation is based on pH readings taken on the batch. It may be necessary to continue ammoniation slightly beyond ammonia formula weight to obtain a pH of 6.5 and if this is done the amount of water added at the end of the process of Example 1 may be accordingly smaller. The pH of the batch at completion should not be in excess of 6.5 because of the tendency for this formulation to gel during storage at higher pH's. Thus, it is very desirable to obtain a final pH as close to 6.5 as possible.

An automatic pH recorder can be used to check pH or the pH may be taken via a pH meter reading every 5–10 minutes, or at even closer intervals as the pH rises toward 6.5 to obtain a final pH reading of substantially 6.5, i.e., 6.3–6.7.

The high rates of ammoniation at the high temperatures called for in this recipe shorten the process time and at the same time avoid thick stage difficulty in the formulation given but they do not provide a very stable pH. The total processing time for this recipe was about 95 minutes.

It has been determined in the laboratory that rapid rates of ammoniation result in an increase in reversion. It has also been shown that the reduction of temperature and ammoniation below those levels used in this commercial formulation give a more stable pH, better suspension characteristics and less reversion of phosphorus. Thus, it is sometimes desirable to ammoniate the batch at a lower rate while maintaining a lower temperature. If sufficient water is available at the plant site the water jacket on the reactor can be used to lower the temperature of the batch. Of course, a reduced ammoniation rate would reduce the heat produced by the reaction at a given time by spreading the reaction over a longer period of time. After ammoniation additional water is added if necessary to bring the batch to weight and then the product is removed from the reactor.

While the foregoing procedure and formulation was developed for commercial use, the following formulation and procedure has been developed in the laboratory and from laboratory investigations it is believed to be at least equally good.

9-18-0—3,200 GRAM BATCH

| Raw material | Grams | Grams N | Grams TPA |
|---|---|---|---|
| Water: | | | |
| Total | 601 | | |
| (Added at start) | (300) | | |
| Nitric acid | 1,000 | 124.5 | |
| Phosphoric acid | 648 | | 349.8 |
| Phosphate rock | 720 | | 244.8 |
| Sulfonated oleic acid, Na salt | 5 | | |
| Ammonia | 226 | 185.3 | |
| Total | 3,200 | 309.8 | 594.7 |
| Formulation analysis | | 9.68 | 18.60 |
| Estimated APA | | | 18.1 |

The ratio of ingredients was thus approximately $HNO_3$ 35, $P_2O_5$ as phosphoric acid 22, $P_2O_5$ as phosphate rock 15, $NH_3$ 14, $H_2O$ at beginning 54, $H_2O$ total 73, sulfonated oleic acid, Na salt 0.07.

The apparatus used in the lab included a 4 liter resin kettle equipped with a three inch turbine blade agitator, an automatic anhydrous ammonia dispensing unit discharging under the agitator blade, and an inlet for solids and acids through the top of the resin kettle.

The procedure used in the laboratory for preparing 9-18-0 was as follows. First, 300 grams of water was added to the resin kettle. Then the agitator was turned on and the 648 grams of phosphoric acid was added to the resin kettle. Next the 720 grams of rock was added to the resin kettle at a substantially uniform rate over a period of about 5 minutes. The sulfonated oleic acid, Na salt was added as needed at the time the rock was added. Then the 1000 grams of nitric acid was added to the resin kettle. The batch was allowed to acidulate for 10 minutes, after the nitric acid was added.

Next ammoniation was begun at 3.0–3.5 grams of ammonia/min./2000 grams of finished product. After 70–75% of the ammonia had been added 400 of water was added to the batch while ammoniation was continued at a reduced rate of 1.0–1.5 grams/min./2000 grams of finished product. Ammoniation was continued until a pH of 6.0 was attained.

The amount of water added to the batch was greater than the amount called for in the formula. The additional water compensated for the water that was lost due to boil off as a result of the heat of reaction. The boil off is usually sufficient to allow this additional water to be added without cutting the grade or analysis below that desired when the operation is carried out without supplemental cooling.

When the pH reached 6.0, additional water was added to bring the total weight to 3195 grams. Then ammoniation was continued until the desired finishing pH of 6.5 was attained. This was found to supply at least the total formula ammonia when the formulation was prepared repetitiously and it was frequently found to supply slightly more than the amount of ammonia called for in the formula. A total of 75 minutes was required to complete this formulation procedure.

Typical analysis obtained in the laboratory for three different runs are as follows:

| N | TPA | Cl | APA | pH |
|---|---|---|---|---|
| 9.62 | 18.80 | 0.52 | 18.28 | 6.3 |
| 9.52 | 19.10 | 0.72 | 18.38 | 6.5 |
| 9.74 | 18.70 | 0.56 | 18.14 | 6.0 |

EXAMPLE 2.—15 TON BATCH OF 7-14-7

| Raw material | Pounds | Pounds N | Pounds TPA | Pounds K₂O |
|---|---|---|---|---|
| Water: | | | | |
| Total | 8,075 | | | |
| (Added at start) | (4,750) | | | |
| Nitric acid | 6,465 | 805 | | |
| Phosphoric acid | 5,185 | | 2,800 | |
| Phosphate rock | (5,145) | | 1,750 | |
| Sulfonated oleic acid, Na salt | (40) | | | |
| Scale wt. rock and sulfonated oleic acid, Na salt | 4,990 | | | |
| Ammonia | 1,785 | 1,465 | | |
| Muriate of potash | 3,500 | | | 2,100 |
| Total | 30,000 | 2,270 | 4,550 | 2,100 |
| Formulation analysis | | 7.57 | 15.17 | 7.00 |
| Estimated APA | | | 14.4 | |

The ratio of ingredients was thus approximately $HNO_3$ 24, $P_2O_5$ as phosphoric acid 19, $P_2O_5$ as phosphate rock 12, $NH_3$ 12, $H_2O$ at beginning 58, $H_2O$ total 80, sulfonated oleic acid, Na salt 0.07 and $K_2O$ as KCl 14.

The procedure of Example 1 was used, except that, as shown in the formulation, muriate of potash was added and adjustments were made in the quantities of the other ingredients to meet the desired 7-14-7 grade in a 15 ton batch. The muriate of potash was added directly to the reactor vessel when the batch reached a pH of about 6 or at a total ammonia input of about 90%. Ammoniation was stopped at this point long enough to add the muriate of potash. It is also desirable to add any water lost by evaporation at this time. These additions cool the batch sufficiently to allow ammoniation to be completed at a rate of 30 pounds of ammonia per minute without ammonia loss. It will be recalled that the rate at which the batch can adsorb ammonia increased as the temperature decreases.

The total processing time for this recipe was approximately 100 minutes.

While the foregoing formulation and procedure was developed for commercial use, the following formulation and procedure has been developed in the laboratory and from laboratory investigations it is believed to be at least equally good.

7-14-7—4,000 GRAM BATCH

| Raw material | Grams | Grams N | Grams TPA | Grams K₂O |
|---|---|---|---|---|
| Water: | | | | |
| Total | 978 | | | |
| (Added at start) | (300) | | | |
| Nitric acid | 1,000 | 124.4 | | |
| Phosphoric acid | 630 | | 340.2 | |
| Phosphate rock | 700 | | 238 | |
| Sulfonated oleic acid, Na salt | 6 | | | |
| Ammonia | 220 | 180.4 | | |
| Muriate of potash | 466 | | | 280 |
| Total | 4,000 | 304.8 | 578.2 | 280 |
| Formulation analysis | | 7.60 | 14.50 | 7.0 |
| Estimated APA | | | 14.1 | |

The ratio of ingredients was thus approximately $HNO_3$ 28, $P_2O_5$ as phosphoric acid 17, $P_2O_5$ as phosphate rock 12, $NH_3$ 11, $H_2O$ at beginning 43, $H_2O$ total 77, sulfonated oleic acid, Na salt 0.07, and $K_2O$ as KCl 14.

The apparatus used in the lab included a 4 liter resin kettle equipped with a three inch turbine blade agitator, an automatic anhydrous ammonia dispensing unit discharging under the agitator blade, and an inlet for solids and acids through the top of the resin kettle.

The procedure used in the laboratory for preparing 7-14-7 was as follows. First, 300 grams of nitric acid was added to the resin kettle and the agitator was turned on. Then 630 grams of phosphoric acid was added to the resin kettle. Next the 700 grams of rock were added to the resin kettle over a period of about 5 minutes and the sulfonated oleic acid, Na salt was added simultaneously with the rock as needed. Then 1000 grams of nitric acid was added to the resin kettle and the batch was then allowed to acidulate for 10 minutes.

Next ammoniation was begun at 3.0–3.5 grams of ammonia/min./2000 grams of finished product until 70 to 70% of the ammonia had been added. Then 750 grams of water was added to the batch while ammoniation was continued at the rate of 1.0–1.5 grams per minute per 2000 grams of finished product to a pH of 6.0.

The amount of water added to the batch was greater than the amount called for in the formula. The additional water compensated for the water that was lost due to the boil off as a result of the heat of reaction. The boil off is usually sufficient to allow this additional water to be added without cutting the grade or analysis below that desired when the operation is carried out without supplemental cooling.

When, the pH reached 6.0 additional water was added to bring the total batch weight to 3530 grams. Then the 466 grams of muriate of potash was added and agitation was continued for 10 minutes. Ammoniation was then begun again at the rate of about 3.0 grams of ammonia/minute/2000 grams of finished product until the desired finishing pH of 6.5 was attained. The processing time was 80 minutes.

EXAMPLE 3.—15 TON BATCH OF 9-9-9

| Raw material | Pounds | Pounds N | Pounds TPA | Pounds K₂O |
|---|---|---|---|---|
| Nitric acid | 13,135 | 1,635 | | |
| Phosphate rock | (9,045) | | 3,075 | |
| Sulfonated oleic acid, Na salt | (40) | | | |
| Scale wt. rock and sulfonated oleic acid, Na salt | 8,775 | | | |
| Water | 1,630 | | | |
| Sulfate of potash | 900 | | | 450 |
| Ammonia | 1,810 | 1,485 | | |
| Muriate of potash | 3,750 | | | 2,250 |
| Total | 30,000 | 3,120 | 3,075 | 2,750 |
| Formulation analysis | | 10.40 | 10.25 | 9.00 |
| Estimated APA | | | 9.2 | |

The ratio of ingredients was thus approximately $HNO_3$ 49, $P_2O_5$ as phosphate rock 21, $H_2O$ added at beginning 39, $H_2O$ total 49, sulfonated oleic acid, Na salt 0.07 $SO_4$ 3, $K_2O$ as KCl 15, and $K_2O$ as $K_2SO_4$ 3.

First, all of the nitric acid was added to the vessel. Then the agitator was started and the phosphate rock was added at a substantially uniform rate over a period of about 12 minutes. The sulfonated oleic acid, Na salt defoamer was added simultaneously with the addition of the phosphate rock as needed to control foam. After all of the phosphate rock had been added an acidulation period of 10–12 minutes was allowed to assure substantially complete conversion of $P_2O_5$. During this acidulation hold period all of the formula water and the sulfate of potash was added. When the formula water is added before ammoniation is begun with this formulation it has been found that the process proceeds without thick stage problems.

In this particular formulation an amount of $K_2SO_4$ equivalent to 1⅓ units of $K_2O$ was found to contain a sufficient quantity of sulfate to prevent reversion. The amount of $K_2SO_4$ used was equivalent to 1½ units of $K_2O$. This provided a small margin of safety.

Ammoniation was begun at the rate of 6 lbs. $NH_3$/min./ton of finished product. This high rate was continued until the batch reached the boiling temperature. No supplemental cooling was used. The ammoniation rate was then reduced to 3 lbs. $NH_3$/min./ton of product until about 60–70% of the batch requirement had been added, then the rate was reduced to 2 lbs. $NH_3$/min./ton of product until 85–90% of the batch requirement had been added. At this time ammoniation was stopped and the muriates of potash and the water required to replace evaporation loss was added. These additions should cool the batch sufficiently to allow the completion of ammoniaiton at a rate of 2 lbs. $NH_3$/ton of product without ammonia loss to a finishing pH of 7 or slightly above. Thick stage considerations are not involved in ammoniation in this example if the temperature is allowed to rise normally without cooling. Therefore, the rate of ammonia addition is limited only by the rate at which the ammonia can be absorbed in the batch at the higher temperatures and by the possibility of blow-by due to the turbulence of boiling. The passage of ammonia through the batch unabsorbed is usually noticeable and adjustments in the ammonia addition rate can be made accordingly. The completion of ammoniation is based on pH readings taken on the batch.

During the final ammoniation of the batch, pH readings may be obtained that are less permanent than usual on standing. This tendency is augmented by ammoniating at a high rate and high temperature to a high pH. While the procedure of this example will normally give a pH reading of reasonable stability, it has been found to be preferable to wait 5 minutes after ammoniation to a pH of 7 and then recheck the pH. If the pH drops below 6.5, more ammonia should be added to bring the pH back to 7. It has been observed that during storage the pH often drops back to 3 to 5. After completion of the process the batch is removed from the reactor to storage or distribution means.

The total processing time of this recipe was approximately 100 minutes.

While the foregoing procedure and formulation was developed for commercial use, the following formulation and procedure was developed in the laboratory and from laboratory investigations it is believed to be optimal.

9-9-9—4,000 GRAM BATCH

| Raw material | Grams | Grams N | Grams TPA | Grams $K_2O$ |
|---|---|---|---|---|
| Water | 142 | | | |
| Nitric acid | 1,850 | 230.0 | | |
| Phosphate rock | 1,176 | | 400.0 | |
| Sulfonated oleic acid | 5 | | | |
| Sulfate of potash | 160 | | | 80.0 |
| Muriate of potash | 46.7 | | | 280.0 |
| Ammonia | 200 | 164.0 | | |
| Total | 4,000 | 394.0 | 400.0 | 360.0 |
| Formulation analysis | | 9.85 | 10.0 | 9.00 |
| Estimated APA | | | 9.2 | |

The ratio of ingredients was thus approximately $HNO_3$ 52, $P_2O_5$ as phosphate rock 20, $NH_3$ 10, $H_2O$ added at beginning 41, $H_2O$ total 48, sulfonated oleic acid, Na salt 0.06, $SO_4$ 4, $K_2O$ as KCl 14, and $K_2O$ as $K_2SO_4$ 4.

The apparatus used in the lab included a 4 liter resin kettle equipped with a three inch turbine blade agitator, an automatic anhydrous ammonia dispensing unit discharging under the agitator blade, and an inlet for solids and acids through the top of the resin kettle.

The procedure used in the laboratory for preparing 9–9–9 was as follows. First, 1850 grams of nitric acid was added to the reaction kettle and the agitator was turned on. Then the 1176 grams of rock was added to the resin kettle at a substantially uniform rate over a period of about 5 minutes and the sulfonated oleic acid, Na salt was added simultaneously as needed. Acidulation was then allowed to continue for 10 minutes after which 300 grams of water was added to the reactor. This was more water than the formula called for but the excess boiled away.

Next the 160 grams of potassium sulfate was added to the batch and the ammoniation was begun at 5.0 grams of ammonia/minute/2000 grams of finished product. When about 25% of the ammonia had been added to the batch the rate of ammonia addition was reduced to about 3.0 grams of ammonia/minute/2000 grams of finished product until a total of 70–75% of the total ammonia had been added. Then the ammoniation rate was reduced to 1.5–2.0 grams of ammonia per minute per 2000 grams of finished product until a pH of 6.0 was attained. Next, additional water was added to bring the total batch weight to 3530 grams and then 467 grams of muriate of potash was added. Agitation was continued for 10 minutes after the addition of the muriate of potash and then additional ammonia was added at the rate of about 3.0 grams/ammonia/minute/2000 grams of finished product until a pH of 6.5 was attained. The processing time was 80 minutes.

EXAMPLE 4.—15 TON BATCH OF 14-7-7

| Raw material | Pounds | Pounds N | Pounds TPA | Pounds $K_2O$ |
|---|---|---|---|---|
| Nitric acid | 18,700 | 2,320 | | |
| Phosphate rock | (6,620) | | 2,250 | |
| Sulfonated oleic acid, Na salt | (40) | | | |
| Scale wt. rock and sulfonated oleic acid, Na salt | 6,400 | | | |
| Sulfate of potash | 600 | | | 300 |
| Ammonia | 2,460 | 2,020 | | |
| Muriate of potash | 3,000 | | | 1,800 |
| Total | 31,160 | 4,340 | 2,250 | 2,100 |
| Formulation analysis (based on 30,000 lbs.) | | 14.46 | 7.50 | 7.0 |
| Estimated APA | | | 7.2 | |

NOTE.—Additional sulfonated oleic acid, Na salt is added during part of the ammoniation period as needed to suppress foam. This requires approximately 40 additional pounds of the defoamer.

The ratio of ingredients was thus approximately $HN_3$ 70, $P_2O_5$ as phosphate rock 15, $NH_3$ 16, $H_2O$ at beginning 55, $H_2O$ total 47, sulfonated oleic acid, Na salt 0.14, $SO_4$ 2, $K_2O$ as $K_2SO_4$ 2, and $K_2O$ as KCl 12.

The successful accomplishment of this formulation depends upon the loss of 1160 lbs. of water by boil-off. Normal operation without supplemental cooling has been found to yield a boil-off in excess of that required.

At the beginning of the process of Example 4 all of the nitric acid was placed in the reactor. Next the phosphate rock was added at a substantially uniform rate over a period of about 12 minutes. Sulfonated oleic acid, Na salt was added simultaneously with the addition of the phosphate rock as needed to control foam. The batch was then held for 10–12 minutes to assure the substantially complete conversion of the phosphates. After the acidulation hold period the sulfate of potash was added to prevent the reversion of $P_2O_5$ to a citrate insoluble form during ammoniation. In this particular formulation an amount of sulfate contained in $K_2SO_4$ equivalent to 0.9 units $K_2O$ was found to be sufficient to prevent reversion and an amount of $K_2SO_4$ equivalent to 1.0 unit of $K_2O$ was provided to supply a small margin of safety.

After the sulfate of potash had been added ammoniation was begun at 3 lbs./$NH_3$/ton of product. Notice that the starting ammoniation rate was less than the 6 pound starting rate of examples 1, 2 and 3. Thick stage considerations are not involved in establishing the ammoniation rate of this example. The ammoniation rate is limited by the violence of boiling and resulting foam formation. Just prior to attaining a boiling temperature when about 25% of the total ammonia has been added, foam formation begins and continues until the batch color lightens. When the foam begins to form the ammoniation rate is reduced to 2 lbs. $NH_3$/min./ton of finished product. The sulfonated oleic acid, Na salt is added during the foam formation period at a rate of ¼ gal./min. to suppress foam. The use of cooling water during this period of operation to remove some of the excess heat of reaction permits the use of a higher ammonia addition rate. The amount and temperature of the cooling water available will govern the maximum ammonia addition rate compatible with non-foaming operation.

If the temperature of the batch can be kept below boiling the foam problem can be substantially eliminated. However, a slight problem has been encountered with foam at a pH of about 6.5–7 when the batch was kept below its boiling temperature.

When the color of the batch visibly lightens, the addition of the sulfonated oleic acid, Na salt is stopped and the ammonia addition rate is increased to 3 lbs. $NH_3$/min./ton of finished product until 80–85% of the total ammonia has been added. At this point the pH of the batch should be 5.5–6.0 and ammoniation is stopped. The muriate of potash and any water lost by evaporation in excess of the needed 1160 pounds should be added to the batch. These additions should cool the batch sufficiently to allow ammoniation to be completed to a pH of 7 at the rate of 1 lb./$NH_3$/ton of finished product without ammonia loss. Ammoniation is continued to a pH of 7.0, or slightly above in order to assure the attainment of the nitrogen level specified for the fertilizer's analysis. In practice ammoniation has been terminated when the pH of the batch passed just beyond 7.0. It has been found that a pH regression of the slurry produced by this example of 4.4 to 4.6 after a short period of storage is normal.

The reversion problem is particularly severe with this formulation when the temperature exceeds the boiling point. Sulfate of potash is added in this formulation whether or not supplemental cooling is used to prevent boiling. However, it is particularly important to add sufficient sulfate to prevent reversion when the process is carried out under boiling conditions. It has also been observed that when ammoniation is carried out while the batch is boiling in this formulation the fumes are particularly acrid.

Because foam formation occurs in this process until the pH reaches about 6.5 or higher, an appreciable quantity of foam and material often remains in the reactor after the pump-out of the reactor. Two methods of clearing the foam out of the reactor have been used. One method which has been employed is to add 50 pounds of nitric acid to the residual foam and agitate the acid and foam to contact the foam with the acid and then pump out the residue to storage. The other method is to agitate the batch when only 10,000 pounds of 30,000 pounds remains in the reactor while continuing to pump the batch of the reactor until only 5000 pounds remains in the reactor and then stopping the agitation and continuing to pump out the reactor. The slurry resulting from the agitation is frothy but pumpable.

The total processing time for this recipe was approximately 150 minutes.

EXAMPLE 5.—15 TON BATCH OF 7-14-7 (CONTAINING $H_2SO_4$)

| Raw material | Pounds | Pounds N | Pounds TPA | Pounds $K_2O$ |
|---|---|---|---|---|
| Water: | | | | |
| Total | 8,725 | | | |
| (Added at start) | (4,750) | | | |
| Nitric acid | 5,230 | 651 | | |
| Phosphoric acid | 4,970 | | 2,684 | |
| Sulfuric acid | 770 | | | |
| Phosphate rock | (5,145) | | 1,750 | |
| Sulfonated oleic acid, Na salt | (40) | | | |
| Scale wt. rock and sulfonated oleic acid, Na salt | 4,990 | | | |
| Ammonia | 1,815 | 1,488 | | |
| Muriate of potash | 3,500 | | | 2,100 |
| Total | 30,000 | 2,139 | 4,434 | 2,100 |
| Formulation analysis | | 7.13 | 14.78 | 7.00 |
| Estimated APA | | | 14.2 | |

The ratio of ingredients was thus approximately $HNO_3$ 20, $P_2O_5$ as phosphoric acid 18, $P_2O_5$ as phosphate rock 12, $NH_3$ 18, $H_2O$ at beginning 54, $H_2O$ total 81, sulfonated oleic acid, Na salt 0.07, $H_2SO_4$ 5, and $K_2O$ as KCl 14.

The procedure of the Example 2 was used, except that, as shown in the formulation, sulfuric acid was substituted for part of the nitric and phosphoric acids and an additional amount of water was added. A slightly increased amount of ammonia was also used to reach the necessary N analysis. The sulfuric acid was added with the nitric acid and phosphoric acid at the beginning of the process in this recipe but it could have been added after the rock addition was completed or after 20% of the ammonia had been added. This formulation adds part of the acid value in the form of inexpensive sulfuric acid. The sulfuric acid also supplies $SO_4$ which serves to prevent reversion of available phosphates back to unavailable forms.

The total processing time for this recipe was approximately 110 minutes.

EXAMPLE 6.—15 TON BATCH OF 7-14-7 WITH ZINC

| Raw material | Pounds | Pounds N | Pounds TPA | Pounds $K_2O$ |
|---|---|---|---|---|
| Water: | | | | |
| Total | 7,887 | | | |
| (Added at start) | (4,750) | | | |
| Nitric acid | 6,465 | 805 | | |
| Phosphoric acid | 5,185 | | 2,800 | |
| Phosphate rock | (5,145) | | 1,750 | |
| Sulfonated oleic acid, Na salt | (40) | | | |
| Scale wt. rock and sulfonated oleic acid, Na salt | 4,990 | | | |
| Ammonia | 1,785 | 1,465 | | |
| Muriate of potash | 3,500 | | | 2,100 |
| Zinc chelate | 188 | | | |
| Total | 30,000 | 2,270 | 4,550 | 2,100 |
| Formulation analysis | | 7.57 | 15.17 | 7.00 |
| Estimated APA | | | 14.4 | |

The ratio of ingredients was thus approximately $HNO_3$ 24, $P_2O_5$ as phosphoric acid 19, $P_2O_5$ as phosphate rock 12, $NH_3$ 12, $H_2O$ at beginning 58, $H_2O$ total 79, sulfonated oleic acid, Na salt 0.07, $K_2O$ as KCl 14, and trace element 1.25.

The procedure used in Example 6 is identical to that previously set forth in Example 2 except that an amount of water equal to the weight of the trace element that is to be added is subtracted from the formula. The amount of water subtracted from the formulation is so small that it is possible to leave it out without unduly effecting fluidity. The zinc chelate (of ethylene diamine tetra acetic acid) is stirred in after the completion of the formulation procedure just before removal of the batch from the reactor. The processing time for the recipe is approximately 105 minutes.

EXAMPLE 7.—15 TON BATCH OF 7-14-7 WITH ALDRIN (INSECTICIDE)

| Raw material | Pounds | Pounds N | Pounds TPA | Pounds K₂O |
|---|---|---|---|---|
| Water: | | | | |
| Total | 7,955 | | | |
| (Added at start) | (4,750) | | | |
| Nitric acid | 6,465 | 805 | | |
| Phosphoric acid | 5,185 | | 2,800 | |
| Phosphate rock | (5,145) | | 1,750 | |
| Sulfonated oleic acid, Na salt | (40) | | | |
| Scale wt. rock and sulfonated oleic acid, Na salt | 4,990 | | | |
| Ammonia | 1,785 | 1,465 | | |
| Muriate of potash | 3,500 | | | 2,100 |
| Aldrin | 120 | | | |
| Total | 30,000 | 2,270 | 4,550 | 2,100 |
| Formulation analysis | | 7.57 | 15.17 | 7.00 |
| Estimated APA | | | 14.4 | |

The ratio of ingredients was thus approximately HNO₃ 24, P₂O₅ of phosphoric acid 19, P₂O₅ as phosphate rock 12, NH₃ 12, H₂O at beginning 58, H₂O total 79, sulfonated oleic acid, Na salt 0.07, K₂O as KCl 14, and aldrin 0.8.

The procedure used in Example 7 is identical to that of Example 2 except that 120 gallons of water has been deleted from the formula and as the last step in the process before removing the batch from the reactor aldrin is added to the batch and thoroughly mixed in. The processing time for this recipe is approximately 105 minutes. Alternatively the aldrin may be added to the slurry in the applicator vehicle just prior to its field application with a short period being allowed to assure that the aldrin is completely mixed throughout the slurry.

Example 8.—5 ton batch of 9-9-9

| Ingredients: | Pounds |
|---|---|
| HNO₃, 57% | ¹ 4,625 |
| Phosphate rock, 34.4% P₂O₅ | ² 2,910 |
| K₂SO₄, 51.0% K₂O | ³ 415 |
| KCl 60.5 K₂O | ⁴ 240 |
| Anhydrous NH₃ | 525 |
| Water | 675 |
| Sulfonated oleic acid, Na salt | 3.75 |
| Total batch weight | 10,393.75 |

¹ 2636 lbs. 100% NHO₃.
² 1001 lbs. P₂O₅.
³ 212 lbs. K₂O.
⁴ 750 lbs. K₂O.

The weight ratio of ingredients was thus approximately HNO₃ 53, P₂O₅ 20, K₂SO₄ 8, KCL 25, NH₃ 10, water 54, and defoamer 0.08.

The reactor was a 1,300 gallon stainless steel vessel, 9′ high by 2.5′ radius, covered at the top, equipped with agitator, cooling jacket, and with solids and acid inlets through the top, inlet for anhydrous ammonia through the top and extending down the side and discharging under the propeller of the stirrer.

First, all the nitric acid was added at ambient conditions to the vessel, followed by addition of phosphate rock of the following particle size: substantially 100% through 30 mesh, and about 60–70% through 200 mesh, U.S. Standard.

The defoamer is preferably sprayed or dripped onto the up-coming foam as the rock is added.

The rock was added at a substantially uniform rate over a period of about 12 minutes. After a wait of 10–12 minutes (measuring from the cessation of rock addition), which delay is essential for the efficient completion of the acidulation part of the process to assure substantially complete conversion of P₂O₅, the water is added, and all the K₂SO₄ is then added, after which ammonia addition is begun. The rate of ammonia addition at the beginning of the reaction should be fairly rapid, of the order of 10–15 lbs./minute per 5 tons of finished product. The ammoniation reaction is exothermic and the temperature of the mixture begins to rise. After about 150 lbs. of NH₃ has been added in this way, resulting in a mixture pH approaching 1, this rate is reduced to about 7–8 lbs. NH₃/minute per 5 tons of finished product until the second thickening stage is encountered, at about a pH of 5. It is on account of this thickening that the NH₃ addition rate is again reduced; otherwise, a great deal of NH₃ would be lost by failure to disperse it thoroughly into the thickened mass.

As the "slow rate" of ammonia progresses, the temperature continues to rise. When using this embodiment of the invention, it is important that the mixture not be permitted to boil. Accordingly, when the temperature reaches 160–170° F., cooling water is admitted to the reactor jacket. The reaction temperature is never permitted to exceed 200° F. When the pH reaches approximately 5, NH₃ feed is again reduced, this time to 3–6 lbs./minute, per 5 tons of finished product, so as to attain neutrality with a fair degree of precision. It is maintained at this very low rate until the pH reaches substantially 7, i.e., 6.7–7.2. Considerable precision is needed to obtain this final pH, and either an automatic pH recorder should be used; or else the pH taken via pH meter reading every 5–10 minutes or at even closer intervals as the pH rises toward 7. Finally all the KCl is added, to bring up K₂SO₄, as K₂O to about 9%. This KCl is thoroughly stirred in. The interior of the reaction vessel is then preferably washed down. The wash liquor is the product itself. It is desirable to perform this washing step to get all solids on the walls into the slurry and also to minimize the amount of residual KCl available for contact with the nitric acid of the succeeding batch, with evolution of HCl, etc. The resulting slurry analyzes about 24% water, has a density of 1.5–1.6 (typically 1.55) and is ready for transport to the fields for spraying.

Example 9.—5 ton batch of 7-14-7 (with supplemental cooling)

| Ingredients: | Pounds |
|---|---|
| HNO₃, 57% | ¹ 2,500 |
| Phosphate rock, 34.4% P₂O₅ | ² 1,710 |
| Phosphoric acid, 55.0% P₂O₅, 75% H₃PO₄, 17% H₂O | ³ 1,560 |
| KCl, 60.5% K₂O | ⁴ 1.175 |
| Anhydrous NH₃ | 550 |
| Water | 2,700 |
| Sulfonated oleic acid, Na salt | 3.75 |
| Total batch weight | 10,198.75 |

¹ 1425 lbs. of 100% HNO₃.
² 588 lbs. of P₂O₅.
³ 858 lbs. of P₂O₅.
⁴ 711 lbs. of K₂O.

The ratio of ingredients was thus approximately HNO₃ 29, P₂O₅ as phosphoric acid 17, P₂O₅ as phosphate rock 12, NH₃ 11, KCl 24, H₂O 80, and defoamer 0.08.

The apparatus and procedure of Example 8 were used, except that, as shown in the formulation, phosphoric acid was substituted for some of the nitric acid, and the potash was supplied entirely as KCl, viz, the nitric acid was charged to the reactor, followed by part of the water i.e., 1,250 lbs. followed by the phosphoric acid. If desired, the sequence of addition of acids and water can be varied, e.g., water first, followed by either acid, then the other acid. Addition of rock was then begun. This material was added over a period of 10 minutes. Defoamer, sodium salt of sulfonated oleic acid, was added continuously and slowly as the rock was charged. Stirring was continued for 10–12 minutes after the last of the rock was added, to ensure completion of the acidulation, the balance of the water was then added, after which addition of anhydrous ammonia was begun. Stirring rates were again adjusted as in Example 8 to compensate for the sequence of change in consistency in the mix, viz, the thin-thick-thin-thick-thin, until a neutral pH of about 7 was reached, requiring about 100 minutes from first charging the reactor with nitric acid to reaching a pH of 7. Thereafter the KCl was added to give the desired 7-14-7 composition. The finished slurry, containing about 38% water, was recovered as in Example 8.

Example 10.—5 ton batch of 7-14-14 (with supplemental cooling)

| Ingredients: | Pounds |
|---|---|
| $HNO_3$, 57% | [1] 2,500 |
| Phosphate rock, 34.4% $P_2O_5$ | [2] 1,710 |
| Phosphoric acid, 55.0% $P_2O_5$ 75% $H_3Pl_4$, 17% $H_2O$ | [3] 1,560 |
| KCl, 60.5% $K_2O$ | [4] 2,350 |
| Anhydrous $NH_3$ | 550 |
| Water | 1,515 |
| Sulfonated oleic acid, Na salt | 3.75 |
| Total batch weight | 10,188.75 |

[1] 1425 lbs. of 100% $HNO_3$.
[2] 588 lbs. of $P_2O_5$.
[3] 858 lbs. of $P_2O_5$.
[4] 1422 lbs. of $K_2O$.

The ratio of ingredients was thus approximately $HNO_3$ 29, $P_2O_5$ as phosphoric acid 17, $P_2O_5$ as phosphate rock 12, $NH_3$ 11, KCl 47, water 57, and defoamer 0.08.

The apparatus and procedure were identical to that of Example 9 except that the amount of KCl was doubled and the water added was less. The resultant slurry contained about 24% water.

It may be seen from the examples and understood from the preceding discussion that while certain chemical principles apply to all of the formulations, each of the formulations also constitutes a chemical system differing from the other given formulations substantially in chemical characteristics and forming a different chemical system having unique characteristics. Thus while some of the examples have a lab recipe and a commercial recipe, which is indicative of some variation in the formulation being permissible, in most instances substantial variations have been found to produce unsatisfactory results.

From all of the foregoing it may be seen that to produce a satisfactory slurry the following factors must be taken into account: (1) The control of thick processing stages through the manipulation of temperature, concentration and ammoniation rates. (2) The initial conversion of phosphorus to citrate soluble form by regulating the ratio of hydrogen ions to the phosphorus, and for optimal results, at least to an H to $P_2O_5$ mole ratio of 6/1, with the H being active hydrogen, using desirable acidulating ingredients. In other words, when nitric and sulfuric acids are used they provide almost 100% of their acid value as effective hydrogen ion; while phosphoric acid in this system exhibits less of its acid value as effective hydrogen ions. (3) The prevention of reversion during neutralization. (4) The neutralizing of the slurry to provide a slurry that is not so corrosive that it cannot be handled in conventional mild steel storage tanks and applicators. (5) The provision of a slurry that is sufficiently fluid to be pumped and sprayed and that is resistant to the settling of precipitates. In addition, the precipitates that do settle out are generally characterized by being soft and easily redispersed. (6) And, of course, most important the provision of a slurry that has optimal agricultural benefits and that supplies all agricultural needs in one application at an economical cost.

We claim:

1. In the process of treating phosphate rock with an acidulant comprising nitric acid, followed by ammoniation to provide a slurry, the improvement in which (I) the phosphate rock and the acidulant are reacted in admixture with a defoaming agent;
(II) the acidulant is selected from the group consisting of
 (a) nitric acid and sulfuric acid, the sulfuric acid having a concentration in an amount which is about 0.5–4% by weight of the final reaction product;
 (b) nitric acid; $K_2SO_4$ additionally being added in an amount of about 1-6-4% based on the $SO_4$ weight basis;
 (c) nitric acid and phosphoric acid, in which the $HNO_3:H_3PO_4$ weight ratio is substantially 0.93–1.2:1; and
 (d) nitric acid, phosphoric acid and sulfuric acid, in which the $HNO_3:H_3PO_4:H_2SO_4$ weight ratio is substantially 4:5:1;
(III) adding anhydrous ammonia to the reaction mixture having a pH below 1 to neutralize the reaction mixture to a pH of 6–7.5, under adiabatic reaction conditions and under the exotherm generated by reaction of ammonia and acid whereby the reaction mixture is heated to at least 200° F.
(IV) adding water to provide a density in the final reaction product of 1.3–1.6;
(V) the reactants being added in amounts such that about 40–70% of the N is provided by ammonia and the balance by nitric acid; plant-available $P_2O_5$ is at least 9%; the total of N, plant-available $P_2O_5$ and $K_2O$ being about 27–35%; whereby there is obtained a non-gelling, substantially non-settling reaction product in slurry form readily pumped and sprayed and non-corrosive to mild steel.

2. The method of preparing a slurry fertilizer according to claim 1 comprising acidulating phosphate rock, ammoniating said acidulate and obtaining at least two thick stages being at a pH of about 1–2 and the second at a pH of about 4–5, and maintaining the reaction mixture fluid during said thick stage phases by the addition of ammonia at the rate of 3 lbs. $NH_3$/min./ton during the said first thick stage until a pH of 2.0 is reached and thereafter reducing the ammonia addition rate to 1 lb. $NH_3$/min./ton during the said second thick stage while maintaining said reaction at a temperature of at least 190° F.

References Cited

UNITED STATES PATENTS

| 1,517,687 | 12/1924 | Voerkelius | 71—39 |
| 1,948,520 | 2/1934 | Harvey | 71—43 |
| 2,783,139 | 2/1957 | Datin | 71—41 X |
| 2,968,543 | 1/1961 | Nees et al. | 71—37 |
| 3,010,818 | 11/1961 | Jones et al. | 71—40 X |
| 3,177,063 | 4/1965 | Anores et al. | 71—39 X |
| 3,234,005 | 2/1966 | Smalter et al. | 71—29 |

OTHER REFERENCES

Striplin, M. M., et al.; "Compound Fertilizers from . . . and Ammonia," in Industrial and Engineering Chemistry, vol. 44, No. 1 (January 1952), pp. 236–242, TP1A58.

DONALL H. SYLVESTER, *Primary Examiner.*

R. D. BAJEFSKY, *Assistant Examiner.*

U.S. Cl. X.R.

71—37, 43; 23—106